US007099681B2

(12) United States Patent
O'Neill

(10) Patent No.: US 7,099,681 B2
(45) Date of Patent: Aug. 29, 2006

(54) METHODS AND APPARATUS FOR CONTROLLING IP APPLICATIONS DURING RESOURCE SHORTAGES

(75) Inventor: Alan O'Neill, West Hindmarsh (AU)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 10/219,550

(22) Filed: Aug. 15, 2002

(65) Prior Publication Data

US 2003/0037146 A1 Feb. 20, 2003

Related U.S. Application Data

(60) Provisional application No. 60/313,035, filed on Aug. 16, 2001.

(51) Int. Cl.
*H04B 7/00* (2006.01)
(52) U.S. Cl. .................. 455/512; 455/414.1; 455/509; 370/230
(58) Field of Classification Search ................ 455/512, 455/414, 436, 408, 517, 509, 450, 447, 456; 370/328, 230; 709/226
See application file for complete search history.

(56) References Cited

U.S. PATENT DOCUMENTS

| 5,226,071 A | * | 7/1993 | Bolliger et al. .......... 455/435.3 |
| 5,420,909 A | | 5/1995 | Ng et al. |
| 5,574,977 A | * | 11/1996 | Joseph et al. ................ 455/450 |
| 5,794,140 A | * | 8/1998 | Sawyer ........................ 455/408 |
| 5,794,156 A | * | 8/1998 | Alanara ....................... 455/517 |
| 6,011,969 A | | 1/2000 | Vargas et al. |
| 6,061,559 A | * | 5/2000 | Eriksson et al. ......... 455/435.3 |
| 6,067,457 A | * | 5/2000 | Erickson et al. ............. 455/512 |
| 6,092,111 A | | 7/2000 | Scivier et al. |
| 6,134,226 A | | 10/2000 | Reed et al. |
| 6,160,798 A | | 12/2000 | Reed et al. |
| 6,192,248 B1 | * | 2/2001 | Solondz ...................... 455/450 |
| 6,208,865 B1 | * | 3/2001 | Veerasamy .................. 455/450 |
| 6,226,277 B1 | * | 5/2001 | Chuah ......................... 370/328 |
| 6,535,743 B1 | * | 3/2003 | Kennedy et al. ......... 455/456.1 |
| 6,567,416 B1 | | 5/2003 | Chuah |
| 2002/0191593 A1 | | 12/2002 | O'Neill et al. |
| 2003/0013451 A1 | * | 1/2003 | Walton ....................... 455/447 |
| 2003/0137961 A1 | | 7/2003 | Tsirtsis et al. |

(Continued)

*Primary Examiner*—Matthew Anderson
*Assistant Examiner*—Tan Trinh
(74) *Attorney, Agent, or Firm*—Straub & Pokotylo; Michael P. Straub

(57) ABSTRACT

This invention describes how combined session and resource tracking in a mobile node (MN) and/or basestation in a dynamic network resource environment can be used to control reactions to resource shortages. The session that is to experience a resource shortage is detected either by the MN, or communicated to the MN where session signaling is used to modify the session according to MN and basestation policy/configuration. The basestation can alternatively modify the session itself with all the session peers, on behalf of the MN. The specific new reaction to resource shortages that is then enabled is to place the session on hold such that the resources are freed, but so that the session state is maintained in the peers. This is preferable to dropping the session, as is generally the case in dynamic environments, if the likely period of resource loss is short and the session modifications require less overhead than restarting the session when the resources return after dropping the session. In addition, before having resources removed, the basestation can provide the MN with an opportunity to upgrade the priority of its resource request compared to other users in the cell, so that a resource auction is conducted to decide which MN actually loses its resources.

19 Claims, 9 Drawing Sheets

U.S. PATENT DOCUMENTS

2003/0176188 A1  9/2003  O'Neill

2005/0207340 A1 * 9/2005  O'Neill ..................... 370/230

* cited by examiner

METHODS AND APPARATUS FOR CONTROLLING IP APPLICATIONS DURING RESOURCE SHORTAGES

RELATED APPLICATIONS

The present application claims the benefit of U.S. Provisional Patent Application Ser. No. 60/313,035, filed on Aug. 16, 2001 titled "A METHOD FOR CONTROLLING IP APPLICATIONS DURING NETWORK CHANGES THAT RESULT IN RESOURCE SHORTAGES" which is hereby expressly incorporated by reference.

FIELD OF THE INVENTION

The present invention relates to communications session and resource management and, more particularly to methods and apparatus for enabling a mobile node to maintain a communications session despite a decrease in resources, e.g., temporary reduction or loss of bandwidth, used to support the communications session.

BACKGROUND OF THE INVENTION

Many user applications require a minimum amount of resources, e.g., communications bandwidth, to be useful. One example is traditional voice telephony that below either a target minimum bandwidth or above a maximum delay becomes unusable. During call set-up in traditional fixed telecom networks, a signaling channel first checks that sufficient resources exist between the caller and callee before admitting the call and ringing the callee in the case of voice. If there is insufficient resource then the call is refused with a network busy signal. Once admitted, calls are usually dropped by the network only if equipment fails or due to pre-emption mechanisms such as emergency over-rides. This model has continued into much of the traditional wireless industry where the resources are checked and then only dropped under network control as before. A new source of network failures though in wireless networks is that the hand-off between cells can result in a dynamic step-change in network conditions (new cell being fully occupied) that can cause the call to be dropped.

In existing cellular systems the media flow (e.g. voice and/or audio) and call control channel are tightly coupled resulting in both the call signaling and call media forcibly being dropped at the same time. This prevents the signaling channel from being used to advise the mobile node of the resource problem and give the MN options as to how things should proceed. In next generation IP data applications, the session control signaling, e.g., session signaling which may be implemented using, e.g., Session Initiation Protocol—"SIP" and media planes used to implement data transfer and data application signal using, e.g., Realtime Transfer Protocol—"RTP", are designed to be distinct and separable. This allows, in some IP based communications systems, session control signaling and data signaling to be controlled independently.

In IP based applications, multiple user of an IP device may interact as a group, e.g., as part of a group game session. Dropping group members due to the temporary loss of bandwidth by an individual member can result in an inconvenient and un-enjoyable experience for the remaining group members. The sudden loss of a player may leave the other players without notice as to the dropped player's absence. Furthermore, the need for a dropped player to establish a new communications session in order to rejoin the group can result in relatively lengthy delays even after bandwidth has been restored to the dropped member. It would be far more desirable if a group member, e.g., player, subject to a sudden decrease in bandwidth could notify the other group members of a temporary absence and simply halt data communications without terminating the control portion of the group communications session. Thus, the other group members would be aware of the temporary absence of the group member subject to temporary bandwidth limitations and the group member can reestablish the data portion of the connection as soon as bandwidth is restored without having to establish an entirely new communications session.

In some cases, sudden decreases in bandwidth may be due to re-allocation of bandwidth in a cell in which a mobile node is operating or the previous allocation of bandwidth to other mobile communications users in a cell into which a mobile node is traveling. When confronted which such bandwidth problems, which would normally result in a connection being dropped, it would be nice to give the user who is about to have a connection dropped the opportunity to upgrade the user's priority, e.g., by paying a premium, to maintain an existing communications session. In this manner, a user could prevent the loss of the connection by selecting, e.g., to pay a premium to have the connection maintained. Unfortunatley, existing communications systems do not offer a mobile node user this opportunity.

In view of the above discussion, it is apparent that there is a need for methods and apparatus that would allow a communication session to be maintained even when changes in conditions, e.g., due to a mobile device's poor location or signal interference, result in insufficient resources to continue the data portion of the communications session. In addition, there is a need for providing users of mobile devices an opportunity upgrade their relative priority in terms of resource allocation before dropping a connection due to a resource request from a mobile device having a higher priority or because of the previous allocation of the required resources to another device.

SUMMARY OF THE INVENTION

The present invention relates to communications session and resource management and, more particularly to methods and apparatus for enabling a mobile node to maintain a communications session despite a decrease, e.g., temporary reduction or loss of bandwidth, used to support the communications session.

Control signaling often requires far less bandwidth than data transmission. In addition, in some system implementations, control signals used to support a communications session are transmitted on different channels than the channels used to transmit data, e.g., voice, text, game information, etc., as part of a communications session. Accordingly, even when there is insufficient resources to maintain the data portion of a communications session, it is possible to continue the control signaling and thus the communications session, e.g., at a reduced data rate or without the ability to transfer data for a period of time. When the bandwidth required to transfer data becomes available, the data portion of the communications session is restored to normal without the need to re-establish the session. This is in sharp contrast to having to close the session and later restart the session when resources are once more available, as done in the prior art systems.

Prior to dropping a connection, or placing a session into a hold or other state requiring reduced bandwidth, in accordance with one feature of the present invention a mobile node user is provided an option to upgrade the user's resource allocation priority. By selecting the upgrade option the user is provided with the resources, e.g., bandwidth, required to maintain the session and the communications network operator is provided the opportunity to generate revenue by charging a priority upgrade service charge or other type of fee.

Combining session and resource tracking is used in accordance with the invention in a mobile node (MN) and/or basestation in a dynamic network resource environment to control reactions to resource shortages. The session that is to experience a resource shortage is either detected by the MN, or communicated to the MN where session signaling is used to modify the session according to MN and basestation policy/configuration. The basestation can alternatively modify the session itself with all the session peers, on behalf of the MN. The specific new reaction to resource shortages, in accordance with the invention, is to place the session on hold thereby freeing network resources to be used by other nodes. However, as part of the session hold operation, the session state is maintained in the peers of the node subject to the resource shortage, and placed in a hold state where some form of local (to the MN) hold action can be performed for the user such as playing a tone, showing an advert, undertaking a local only game play phase etc. This is often preferable to dropping the session, as is generally the case in dynamic environments. This is particularly the case when the period of resource loss is likely to be short and the session modifications required to transition the session back into an on-state will require less overhead than restarting the session.

In accordance with one feature of the invention, before having resources removed, the basestation can provide the MN with an opportunity to upgrade the priority of its resource request compared to the resource allocation priority of other users in the same cell. In such embodiments a resource auction is conducted to decide which MN actually loses its resources.

While applicable to communications involving various types of data, e.g., voice, text, video, messaging, collaborative distributed applications such as game information, etc., the benefits of the present invention will be explained in various examples in the current application using a voice communications session, e.g., a telephone call, as an example.

Typically, in accordance with the invention, a communications session, e.g., IP telephone call, will be set-up with a minimum resource requirement, below which the session will be ineffective (e.g., (codec) coder/decoder bandwidth requirement). In the case of an IP telephone call communication session, this information would typically be communicated using SIP preconditions and installed using ReSerVation Protocol (RSVP) or similar signaling or preconfigured admission control techniques. During or following call set-up in a cell, a session may fail due to insufficient instantaneous resources although those resources might be available very shortly due to a cell change or the action of other MNs in the cell. In addition, during hand-off into a congested cell, there may well be insufficient resource of the required type to admit the call/session into this cell. A number of existing processes can, and in various embodiments are, undertaken in accordance with the invention, for the MN and its various active sessions subject to sudden resource limitations.

For example, the cell (Quality of Service) QoS control can try to rebalance the existing resources in the cell being entered to release sufficient resources for the new MN using the well-known techniques of pre-emption or borrowing, or the affected sessions of the MN can be dropped at the cell base station.

In addition, according to this invention, if the basestation can maintain session or resource signaling independently of the media stream, and either the MN or the basestation can detect media resource shortages, then in the latter case the basestation can send a message to the MN indicting the media flows or resource requests that cannot be admitted at the new cell, or in the former case, the MN can detect this itself. Note that in either case this detection can also be done within a cell during a session when experiencing resource problems due to varying radio link conditions. The Receiving MN can then create a session signaling or resource message and send it to the other end of the affected sessions to inform them of the resource problem. Note that the basestation can alternatively send this message itself if it has end-to-end session knowledge of all participants and the session descriptions. Both ends are now aware of the problem and can then act on this knowledge to modify the session or resources. A number of alternatives are possible.

The MN communications application, e.g., voice application, in the congested cell can signal the other end (e.g. the voice application on the other end of a call) to put the new or ongoing call on hold, advising the other end that it is due to a temporary resource problem in an reason code. Once the resources become available, communications sessions, e.g., calls on 'resource hold' get access to the available bandwidth. The call is then taken off-hold by the call's participants when the network signals that the resources are available and have been allocated to the node on hold. This is better than losing the call, as in existing systems, because the MN does not immediately redial (creating wasteful signaling) and instead the call will be automatically reconnected at the earliest opportunity. During the break both ends can, and in some embodiments do, exchange messages to be played, e.g., using reduced bandwidth signaling such as text messaging. In other embodiments the messages are signaled by the local BS to both ends and/or locally stored messages are played at the direction of the BS or MN.

As an alternative to the above described resource shortage handling technique, the two application endpoints, e.g., MNs, can renegotiate the session description to be used during resource problems or this information can be exchanged when the original call was being set-up during session description negotiation. The session description would describe how to react to resource failure and can include: drop to text chat, drop to a lower codec fidelity or bit rate, play a message, etc.

Alternatively, the reaction to insufficient resource could be to divert the session to a media recorder. In such an embodiment the unaffected application endpoint leaves a message which the affected user can listen to automatically when the resource becomes available and maybe then decide whether or not to call the unaffected user back.

Alternatively, the call can, and in various embodiments is, redirected to a third person (e.g. a manager's secretary)/another team member, or to another terminal for the affected user such as a fixed phone near the MN's current location. The new call location could be communicated to the affected user via the still functional signaling plane.

Alternatively, in various embodiments the payer for the call (normally the caller) or the affected user (additional payer for the local resource) is given the chance to increase the pre-emption level (resource priority) of the media flow, with an associated increase in 'call' cost, to enable the call to pre-empt an existing call and use its resource. In this case the message to the caller should include advice on the minimum required pre-emption level and the associated cost. In parallel, in some embodiments the caller on the identified call whose resources are to be removed (call to be pre-empted) is involved, e.g., notified of the impending interruption of service, so that an instantaneous 'bidding war', with a single bid per end-point, can be undertaken as to who gets the resource. Alternatively, such a bidding war can be avoided by a predetermined pre-emption ordering according to service level agreements (e.g., Gold users win over Silver users).

In addition to the session/resource signaling responses it can be beneficial to put a rate-limit on the number of renegotiations in a fixed period to avoid responding too quickly to resource changes. In accordance with one feature of the invention this is achieved by adding hysterisis to the session or resource transition, and by setting a minimum reconfiguration time for each session. This increases in importance as the rate of cell change increases (small cells, fast MNs) to the extent that the signaling round trips are a significant fraction of the cell transition time. In effect, the slower the cell change, the more opportunity there is for session renegotiation whilst faster transition times increase the importance and utility of the temporary call hold feature of the present invention.

Various features of the present invention such as a session holdmessage are particularly well suited to group communications sessions, e.g., multi-participant game communications sessions, where it is useful to convey temporary absence information to other group members. The signaled absence may be due, e.g., to being placed into a hold state due to resource shortages. In response to the absence message, the game application being executed by the group may take appropriate action to protect a players position in the game until such time as the player's bandwidth and connection are restored to normal.

Numerous additional features, benefits, applications and embodiments of the present invention are described in the detailed description which follows.

DETAILED DESCRIPTION

Figure 1:
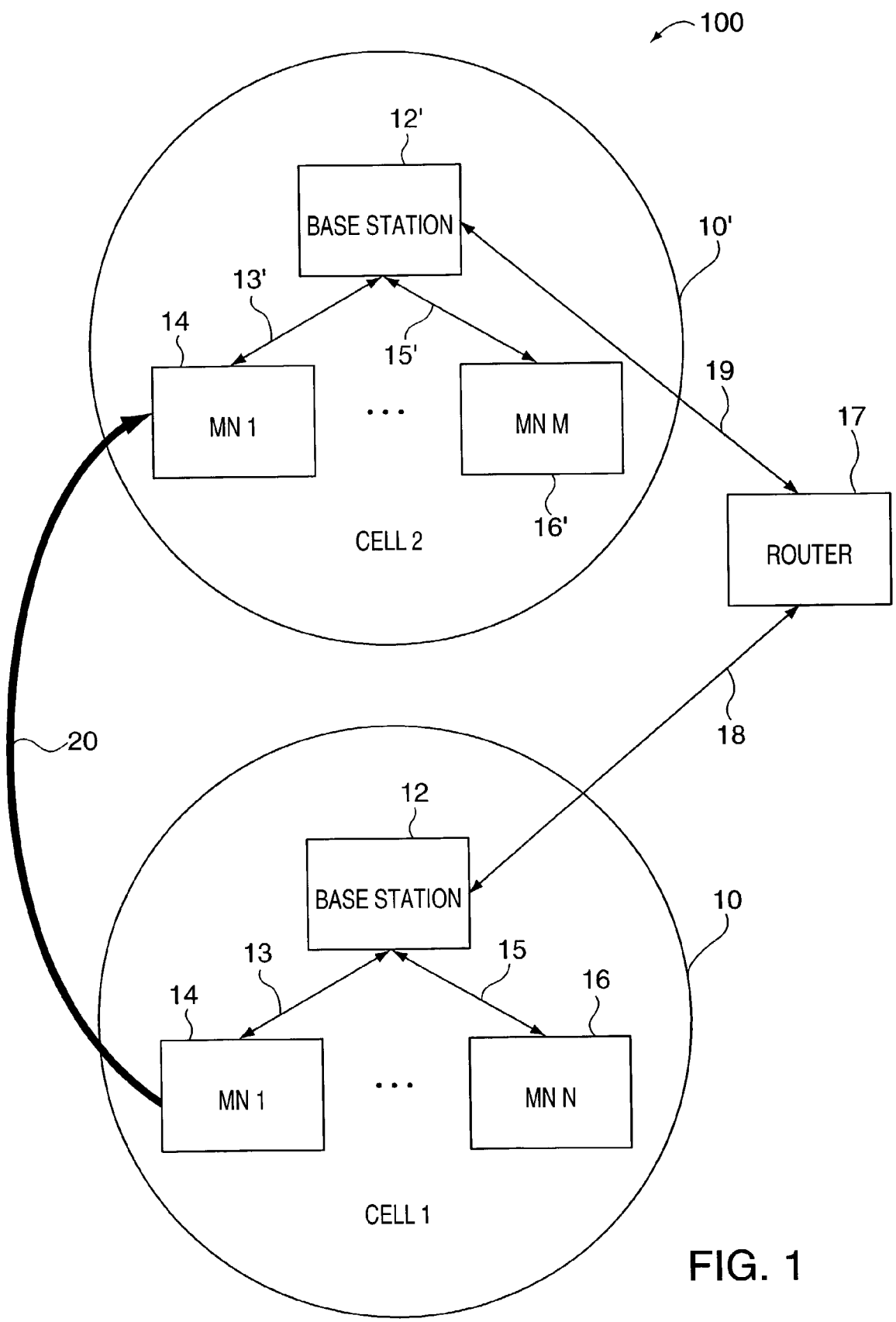
FIG. 1 illustrates an exemplary communications system implemented in accordance with the present invention.

The present invention relates to communications session and resource management and, more particularly to methods and apparatus for enabling a mobile node to maintain a communications session despite a decrease in resources, e.g., temporary reduction or loss of bandwidth, used to support the communications session.

Various aspects of the present invention are directed to novel methods, apparatus and data structures for enabling a mobile node to roam in a foreign network, with multiple basestation handoffs, while permitting the basestation and mobile node to collaborate to enable the mobile node and its session peers to adapt to resource shortages, either as a result of hand-offs or due to changing channel, e.g., radio channel, conditions. This is achieved by placing particular sessions into a hold state in accordance with the invention as necessitated by resource shortages. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter and embodiments made obvious by the text of this application.

Various terms used in the present application will now be explained so that they can be properly interpreted in the description which follows.

Mobile Node: A host or router that can change its point of attachment from one network or sub-network to another. Mobile nodes may have some or all of the following attributes. A mobile node may change its location without changing its IP address; it may continue to communicate with other Internet nodes at any location using its (constant or persistent) IP address, assuming link-layer connectivity to a point of attachment is available. In various embodiments a mobile node is given a long-term (or persistent) (e.g., IP) address on a home network. This home address may be administered in the same way as a "permanent" IP address is provided to a stationary host. When away from its home network, a "care-of address" is associated with the mobile node and reflects the mobile node's current point of attachment. The mobile node normally uses its home address as the source address of all IP datagrams that it sends.

Basestation: A node that serves as a network attachment point for one or more mobile nodes.

Cell: The area of wireless coverage resulting from radio propagation and system limits that extends out from a radio antenna on a basestation.

Session: A communication relationship that has a session description, which is negotiated and agreed between one or more session peers. The session description typically includes the time, duration and media types (voice/video codecs etc) for the session.

Session Peer: A peer with which a network node, e.g., a mobile node, has a negotiated session. Session peers can be mobile or stationary.

Link: A facility or medium over which nodes can communicate at the link layer. A link underlies the network layer.

Link-Layer Address: An address used to identify an endpoint of some communication over a physical link. Typically, the Link-Layer address is an interface's Media Access Control (MAC) address.

Node: A network element that serves as host or a forwarding device. A router is an example of one type of node.

FIG. 1 illustrates an exemplary communications system 100 implemented in accordance with the methods and apparatus of the present invention. The system 100 includes first and second cells 10, 10' and a router 17. The router 17 may be coupled to, e.g., the Internet. As shown, the cell 10 comprises a basestation 12 and a plurality of mobile nodes 14, 16. The base station 12 manages mobile nodes (MNs) 14, 16 whilst in said cell, specifically providing bi-directional radio communications links 13,15 between the basestation and each mobile node. The basestation dynamically adjusts the bandwidth of the radio links 13, 15 to share the bandwidth between all mobile nodes in the cell 10 as a function of the mobile nodes resource requirements and, in some embodiments, resource allocation priority. Mobile node resource requirements are known as a result of resource and/or session signaling from the mobile node 14, 16 to the basestation 12, and/or from mobile node specific configuration known to the basestation 12 independent of communications with the mobile nodes 14, 16. Cellular networks are typically comprised of a multitude of such cells. In regard to FIG. 1, the second cell 10' is another cell which is the same as or similar to cell 10. Elements of the second cell are denoted using a ' to distinguish them from like numbered elements of the first cell. For example the base station in the second cell 10' is indicated using reference number 12'.

In the FIG. 1 example, mobile node 1, 14 appears in both the first and second cells. While this may occur in cases where cells overlap, in the FIG. 1 example, the presence of the first mobile node 14 in the second cell 10' occurs as the result of movement of the mobile node 14 from the first cell 10 to the second cell 10' as represented by arrow 20. Thus, in the FIG. 1 example, mobile node 14 is present in second cell 10' at a point in time subsequent to the time it is in the first cell 10.

The base stations 12, 12', of the first and second cells 10, 10', are interconnected by network nodes such as IP router 17 which are coupled to the base stations by communications links. In the FIG. 1 example, fixed communication links 18, 19 interconnect the router 17 and the basestation 12, 12'. This allows the base stations 12, 12', and mobile nodes connected thereto, to interact with one another by way of communications links 18, 19 and router 17.

Communications resources, e.g., bandwidth, available to a mobile node 14 may vary as a function of a variety of factors including demands of other nodes in a cell 10, 10', resource demands of nodes entering and/or leaving the cell, and the quality of the radio link with the base station 12 or 12' servicing the mobile node.

When a mobile node (MN) 14 moves geographically, the radio propagation between it and nearby basestations (BS) 12, 12' varies. As a result of changes in radio communication due to movement, when moving into the second cell 10' from the first cell 10, the preferred BS changes from 12 to 12'. In order to allow communication through the preferred base station a hand-off will occur from the current base station to the new preferred base station. Thus, when a mobile node moves from the first cell 10 to the second cell 10' a handoff will occur. As a result the mobile node, e.g., node 14, entering the second cell 10' will begin being served by BS 12'. This hand-off causes the resource and session information, sometime called "state" or "state information", known in BS 12 to be transferred to BS 12'. As a result of the handoff, the resource demands in cell 10 are reduced while the demand for resources in cell 10' increases due to the movement of the MN into the cell 10'.

As the MN 14 moves within the new cell 10' the maximum potential radio link capacity in either direction between MN 14 and BS 12' will vary as a function of the mobile node's, 14, distance from the base station 12'. Changes in the maximum potential radio link capacity can affect the resources available to the MN 14. Hand-offs for other MNs, e.g., 16, into the same cell 10' can place additional demands on the resources in the cell 10'. The basestation 12' is used to manage resources, and resource allocation requests, as mismatches occur between the total available resources in cell 10' and the sum of the resource demands from MNs in the cell 10'. This management may result in the basestation requiring a node with allocated resources to discontinue, e.g., relinquish, some of the utilized resources before the mobile node completes an ongoing communications session. While in known systems this would normally result in a communication session being dropped, in accordance with the present invention a communications session may be placed into a hold state as will be discussed further below.

Figure 2:
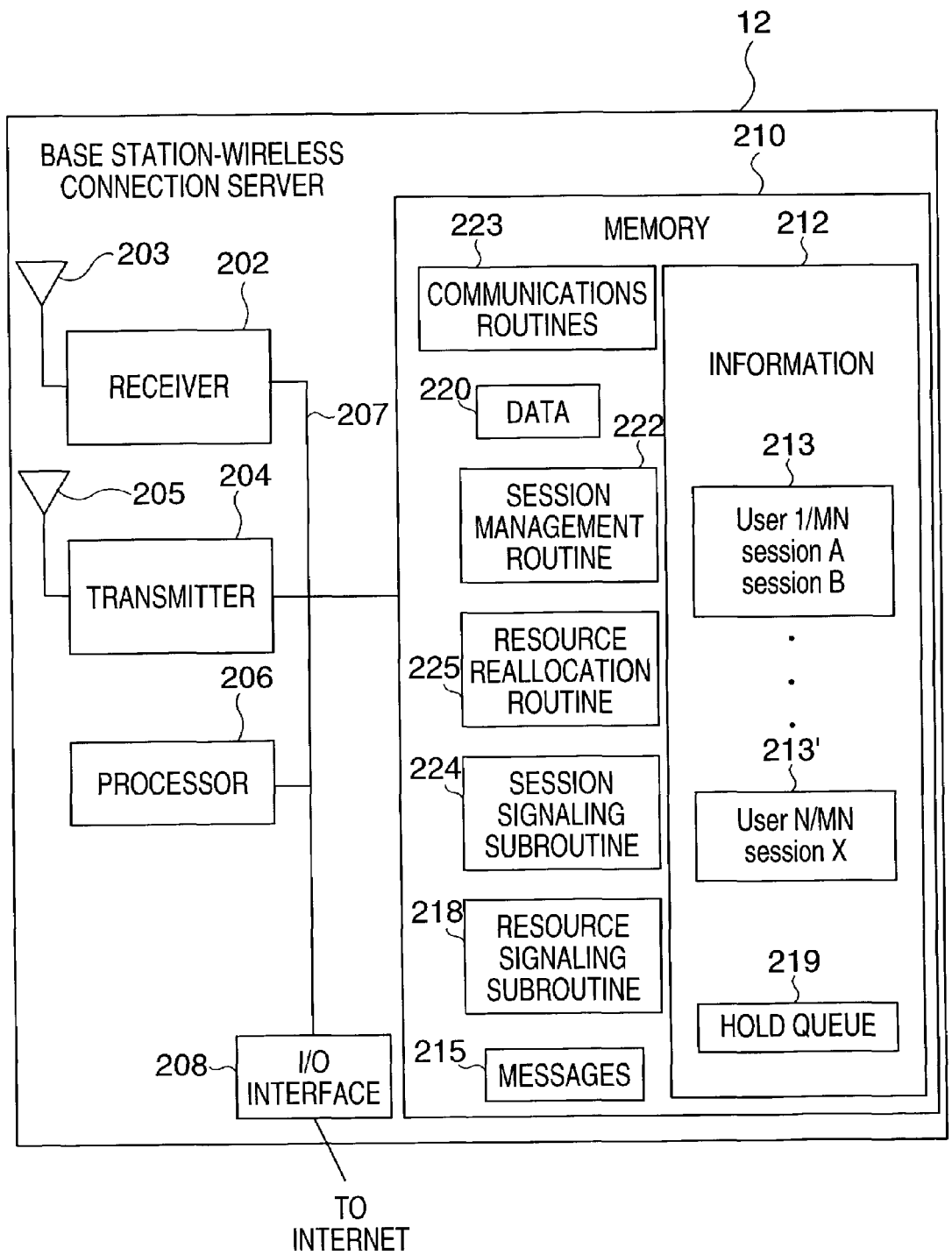
FIG. 2 is a block diagram of an exemplary base station that may be used in the communications system of FIG. 1.

FIG. 2 is a block diagram of an exemplary BS 12 that may be used in the communications system of FIG. 1 to permit a roaming mobile node to effectively manage sessions during resource shortages. As shown, the exemplary BS 12 includes a receiver circuit 202, transmitter circuit 204, processor 206, memory 210 and a network interface 208 coupled together by a bus 207. The receiver circuit 202 is coupled to an antenna 203 for receiving signals from mobile nodes. The transmitter circuit 204 is coupled to a transmitter antenna 205 which can be used to broadcast signals to mobile nodes. The network interface 208 is used to couple the base station 12 to one or more network elements, e.g., router 17 and/or the Internet. In this manner, the base station 12 can serve as a communications element between mobile nodes serviced by the base station 12 and other network elements.

Operation of the base station 12 is controlled by the processor 206 under direction of one or more routines stored in the memory 210. Memory 210 includes communications routines 223, data 220, session management routine 222, resource reallocation routine 225, session signaling subroutine 224, resource signaling subroutine 218, messages 215, and active user information 212. Communications routines 223, include various communications applications which may be used to provide particular services, e.g., IP telephony services or interactive gaming, to one or more mobile node users. Data 220 includes data to be transmitted to, or received from, one or more mobile nodes. Data 220 may include, e.g., voice data, E-mail messages, video images, game data, etc. Session management routine 222 is to oversee various communications sessions which may be supported by the base station 12 at any given time. Each mobile node in the cell serviced by the base station 12 may have any number of active communications sessions going on at any given time. Session management routine 222 is responsible, at least partially, for resolving conflicting resource requests that may be made by the various mobile nodes in a cell. Resource reallocation routine 225, is used by the base station 12 to address resource allocation issues, specifically when there are insufficient resources available to satisfy the resource requests made by the various mobile nodes being serviced by the base station 12. Session signaling subroutine 224 is responsible for controlling session signaling, e.g., SIP signaling, which is supported by the base station 12. Resource signaling subroutine 218 is responsible for controlling resource signaling, e.g., RSVP signaling, which is supported by the base station 12. Messages 215 may be stored messages sent to notify communications session participants of the temporary absence of a communications session participant and/or to notify the session participants that a communications session participant has been put on hold. Messages 215 may also be stored messages sent to notify communications session participants of the temporary absence or return of a session resource. Active user information 212 includes information for each active user and/or mobile node serviced by the base station 12. For each mobile node and/or user it includes a set of state information 213, 213'. The state information 213, 213' includes, e.g., a list of communications sessions in which the node and/or user are participating, the communications resources used by each listed communications session, and whether the session and/or resource is in an active, e.g., session on state, or a hold state as supported in accordance with the present invention.

In accordance with the present invention, resource shortages are handled by base station 12 under the direction of session management and/or resource allocation routines 222, 225 potentially in conjunction with the MN 14, based on the relative importance of user sessions known from user data or via negotiation with MNs. Various exemplary session management and resource allocation routines which may be used as the base station routines 222, 225 will be discussed below.

Figure 3:
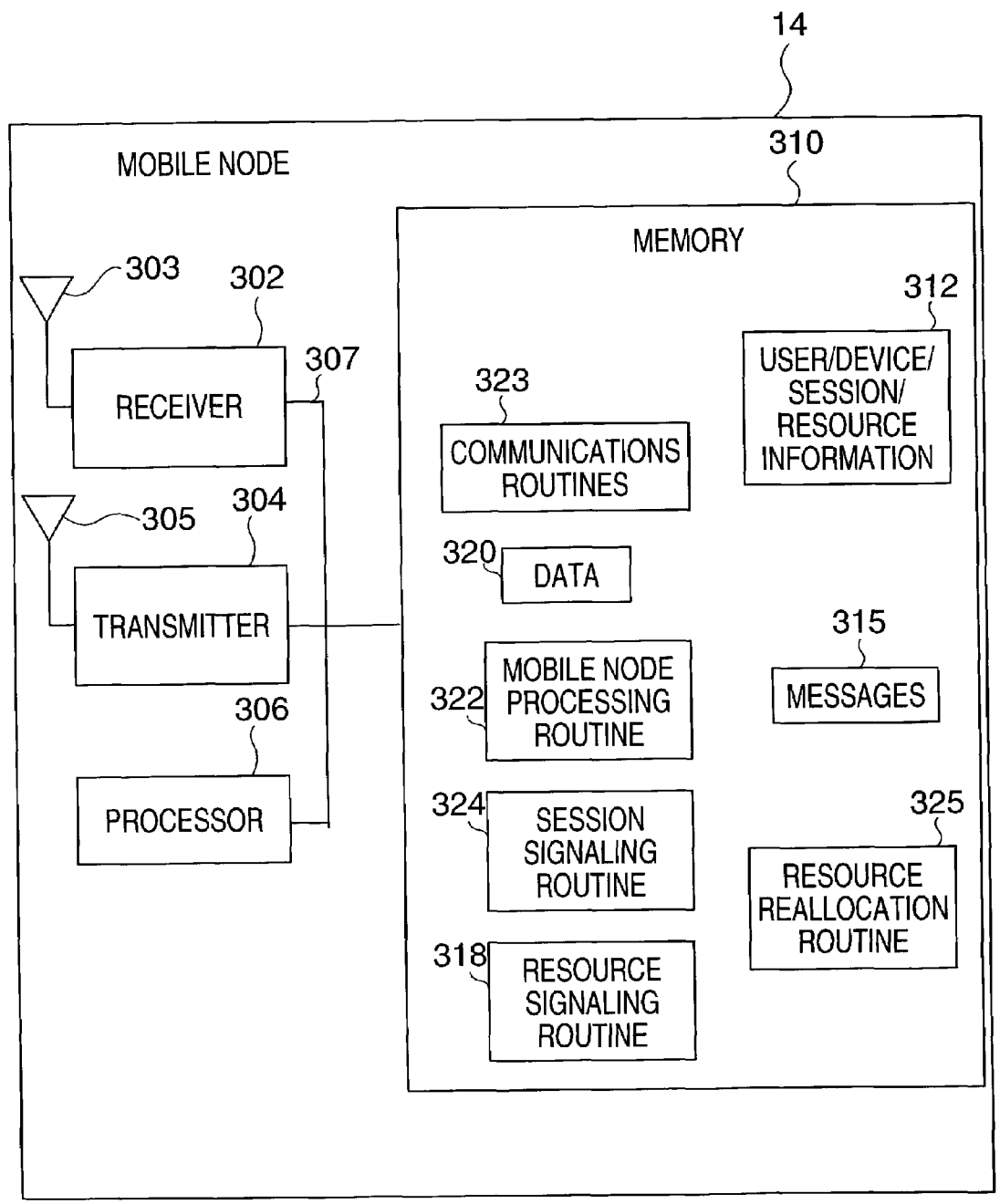
FIG. 3 is a block diagram of an exemplary mobile node that may be used in the communications system of FIG. 1.

FIG. 3 is a block diagram of an exemplary mobile node (MN) 14 that may be used as one of the mobile nodes 14, 16 of the communications system shown in FIG. 1 along with the the exemplary base station (BS) of FIG. 2. When used in combination with the base station of FIG. 2 in accordance with the present invention, mobile node 14 can support the maintenance of communications sessions during resource shortages, e.g., in a session hold state.

The exemplary MN 14 includes a receiver circuit 302, transmitter circuit 304, processor 306, memory 310 coupled together by a bus 307. The receiver circuit 302 is coupled to an antenna 303 for receiving signals from one or more basestations 12, 12'. The transmitter circuit 304 is coupled to a transmitter antenna 305 which can be used to broadcast signals to basestations 12, 12'. The mobile node 14 can interact with mobile nodes and other network elements by establishing communications sessions through a base station 12, 12'.

Operation of the mobile node 14 is controlled by the processor 306 under direction of one or more routines stored in the memory 310. Memory 310 includes communications routines 323, data 320, mobile node processing routine 322, resource reallocation routine 325, session signaling subroutine 324, resource signaling subroutine 318, messages 315, and information 312. Communications routines 323, include various communications applications which may be used to provide particular services, e.g., IP telephony, E-mail, video, games, etc. to a user of the mobile node 14. Data 320 includes data to be transmitted to, or received from a base station 12, 12'. Data 320 may include, e.g., voice data, E-mail messages, video images, game data, etc. Mobile node processing routine 322 is used to oversee various communications sessions which may be supported by the base station 12 at any given time, to detect and to respond to various trigger events. In response to a trigger event, such as the receiving a particular message or detecting a resource shortage, the processing routine 322 can control the mobile node to transition a communications session between a session on state and a session hold state. It can also control a communications session to transition from a session hold state to a session on state, e.g., when an event such as the allocation of resources needed to restore a communications session to an on state is detected. Each mobile node 14 may have any number of active communications sessions going on at any given time. Resource reallocation routine 325 is used, in some embodiments, by mobile node 14 to address resource allocation issues when there are insufficient resources available to satisfy the resource requirements of the various communication sessions the mobile node 14 is involved in. Session signaling subroutine 324 is responsible for controlling session signaling, e.g., SIP signaling, which is supported by the mobile node 14. Resource signaling subroutine 318 is responsible for controlling resource signaling, e.g., SIP preconditions or RSVP signaling, which is supported by the mobile node 14. Messages 315 may be stored messages sent to notify communications session participants of the impending temporary absence of the mobile node from an on going communications session. This may include indicating that the mobile node 14 is being put on hold for a particular communications session. Information 312 includes information about the ongoing communications sessions supported by the device. It may list such sessions on a per user basis where the device can be used by multiple users. For each communications session, the information 312 includes resource and status information, e.g., the communications used and/or required for the session and whether the communications session is in a session on or a session hold state. An exemplary mobile node processing routine which may be used as the routine 322 will be discussed in detail below.

Figure 4:
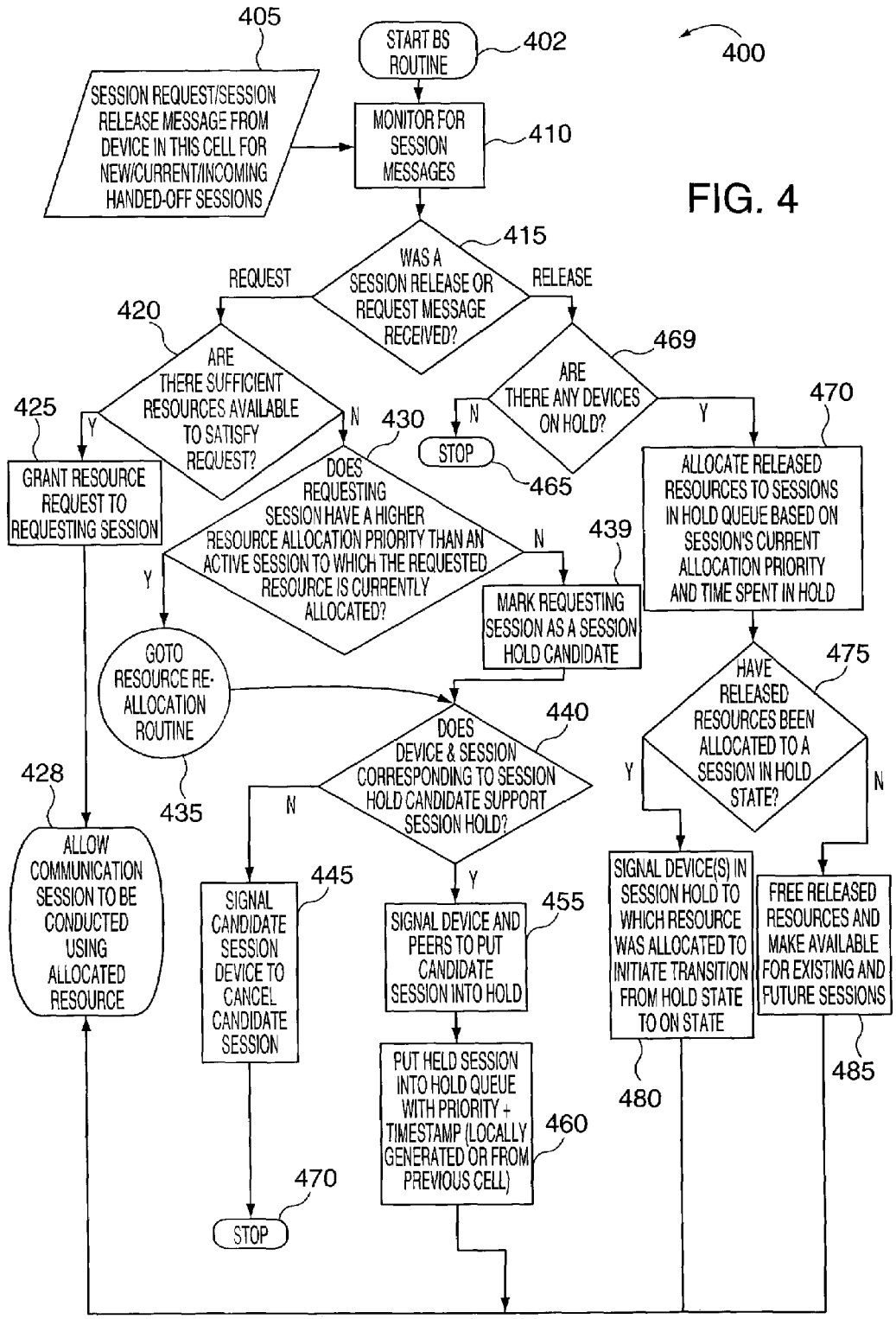
FIG. 4 is a flow diagram illustrating the steps of an exemplary routine that can be used by a basestation to control session hold transitions for mobile nodes in accordance with the present invention.

FIG. 4 is a flow diagram illustrating the steps of an exemplary base station session management routine 400 that can be used as the session management routine 222 of exemplary basestation 12. The routine 400 starts in step 402 when the routine is executed by the base station's processor 206, e.g., after the base station 12 is powered up. As indicated by input block 405, the main acts of the method 400 are performed in response to trigger events 405, which correspond to the receipt of messages or the detection of particular conditions. Trigger events are detected in step 410 and cause processing associated with the trigger event to proceed to step 415. Monitoring is performed in step 410 on a continuous basis with each detected trigger event resulting in separate processing, e.g., by steps 415 etc sequence. Trigger events 405 include, for example, session request messages and session release messages. Such messages may be generated either by MNs 14, 16 in the cell or by the BS 12 in response to session state transitions within the BS 12 due to hand-off activity such as existing sessions leaving or arriving into the cell 10 with MNs 14. In step 410, a monitoring process looks for changes in the set of sessions employed by the plurality of MNs in the cell, along with the resources associated with those sessions. In response to detection of a session message, operation proceeds to step 415. In step 415, a test is conducted to determine if additional resources have been requested or existing resources released, e.g., whether a session request or release message was received.

If additional resources have been requested, operation proceeds from step 415 to step 420. In step 420 the total amount of resources, including the new request, required for ongoing sessions at the BS 12 is compared to the total resources available in the cell 10, to see if the new resource request can be granted in step 420. This can simply be a comparison between the amount of free resource in the cell and the size in terms of resources of the additional session request. Note that a session request includes a change in the session description of an existing session that increases the required resources for that session. Thus, in step 420 the BS 12 decides whether or not there are sufficient resources, e.g., bandwidth, available to satisfy the request. If sufficient resources are available to satisfy the required operation proceeds to step 425 wherein the BS 12 grants the requested resource(s) to the requesting session. Step 425 leads to block 428 wherein the BS 12 allows a new session to be conducted using the granted resource or modifies an existing session to employ the new granted resources for the communication session.

If, in step 420 the BS 12 determines that there are insufficient resources available to satisfy the received resource request, operation proceeds from step 420 to step 430. In step 430 a comparison between the priority of the requesting session is made to the priority of existing sessions to which the requested resource has been allocated. If in step 430 it is determined that the requesting session does not have higher priority, than an existing session which is using the requested resource, operation proceeds to step 439. In step 439, the requesting session is marked as a session hold candidate. Operation proceeds from step 439 to step 440.

If in step 430 it was determined that the requesting session has a higher priority than a session to which the requested resource is already allocated, the resource will be reassigned to the requesting session. As part of the resource reallocation process, in step 435, processing goes to the start of a resource re-allocation routine, e.g., the exemplary resource re-allocation routine 500 shown in FIG. 5 (XX 500 was not marked in FIG. 5 so I have updated). The resource re-allocation routine determines from which ongoing session the requested resource is to be reallocated. The existing session from which the resource is to be taken is identified and marked by the resource re-allocation routine as a session hold candidate. Once processing by the re-allocation routine is completed, i.e., a session is identified and marked as a session hold candidate, operation returns to the main processing routine 400 and continues from step 440.

In step 440 a test is made against the user/device/session data 213, to see if the device and session corresponding to the session marked as a hold candidate, supports a session hold state, whereby the marked session and the session participants can be put on hold temporarily until resources become available. If the device or session participants do not support a hold state, meaning the session hold candidate will have to be terminated to refuse the session request, or to permit the reallocation of requested resources, then operation proceeds from step 440 to step 445 where a signal is sent to the participants in the session hold candidate cancelling the session and the corresponding resource request (I have modified the text in 445 accordingly). Operation proceeds from step 445 to Stop step 470 wherein processing in response to the received session request is halted.

Referring once again to step 440, if it was determined that the device and session corresponding to the session hold candidate did in fact support a session hold state, operation would proceed to step 428 via steps 455 and steps 460. In step 455 the BS 12 signals the session peers to put the session hold candidate into session hold, and optionally includes a reason code to explain why this is happening, and a hold action instruction to be undertaken by the session software at the session peers during the hold period. Examples of such actions include the playing a tone, displaying a message to the screen, or in an interactive game invoking game play local to the node (game player and gaming server) that does not disadvantage the session peers in session hold compared to other session at the game server in the same game. Then, in step 460, the held session is placed into a hold queue 219 with, e.g., session priority and time stamp information. Thus, the held session is put into a queue of held sessions at that BS 12 with a priority and locally generated timestamp. If the session request is from a held session that just transferred into this cell as part of a hand-off, then the priority and timestamp of that held session will not be updated at block 460, but will be installed as is into the hold queue of this cell. This is so that handed off sessions do not lose their global place in the session hold queue at a particular cell, during a cell change, and requires a degree of time synchronization between basestations as is common in exemplary implementations. Accordingly, as the mobile node 14 passes from cell 10 to cell 10' the hold queue 119 information corresponding to sessions being maintained by the mobile node 14 is passed along with other state information from BS 10 to BS 10'. As a result, the hold queue 219 may include hold information transferred from another cell as part of a handoff operation.

Operation proceeds from step 460 to step 428 wherein the BS 12 allows the communication session to which the resources were allocated to be conducted using the allocated resources.

The request message processing branch of the routine 400 has been described in detail. Processing of resource release messages will now be discussed. If in step 415, it is determined that a resource release message was received, operation proceeds from step 415 to step 469. The resource release message may be a result of a MN 14 and its sessions leaving the cell, the cessation or renegotiation for lower resources for a particular active session, or new resources becoming available in the cell 10 for other reasons such as capacity increases. In step 469, a check is made to see if any sessions are presently in session hold and hence awaiting resources. If no sessions are in hold then processing of the received release message stops in stop step 465 but monitoring for resource messages at block 410 is allowed to continue. If in step 469 it is determined that there are sessions in hold then operation proceeds to step 470. In step 470, the available resources are allocated to held sessions in the queue, with the highest priority sessions being served first, and the length of time in session hold, determined from the global timestamp, being used to order allocations within the same priority level. Note that if the resources are insufficient for higher priority session to be taken out of session hold then a lower priority session with smaller resource requirements can still be allocated the resource to ensure maximum use of resources is made. Other well-known algorithms are also applicable for ordering the sessions in the hold queue, and for holding back partial resources for high priority sessions with large resource requirements, in preference to allocating such resources to lower priority sessions From allocation step 470, operation proceeds to step 475. In step 475, a determination is made as to whether the released resources were allocated to a session in hold state. If the freed resources were insufficient to enable any session to be brought out of session hold, then the released resources are simply left spare at the input to step 475 and operation will proceed to step 485. In step 485 the unused resources are made available for use in servicing future resource requests, or borrowed by elastic applications with resources allocated that are less than the peak resources possible for that application, or cam be consumed by best effort traffic for which no resource signaling is conducted. In contrast if in step 470 a session in hold has been granted sufficient resources then operation would proceed via step 475 to step 480. In step 480 the basestation 12 signals the session peers to transition the session to which the resources were allocated from hold into an active state and then allows the session to use those resources in step 428 for purposes of a communication session.

Figure 5:
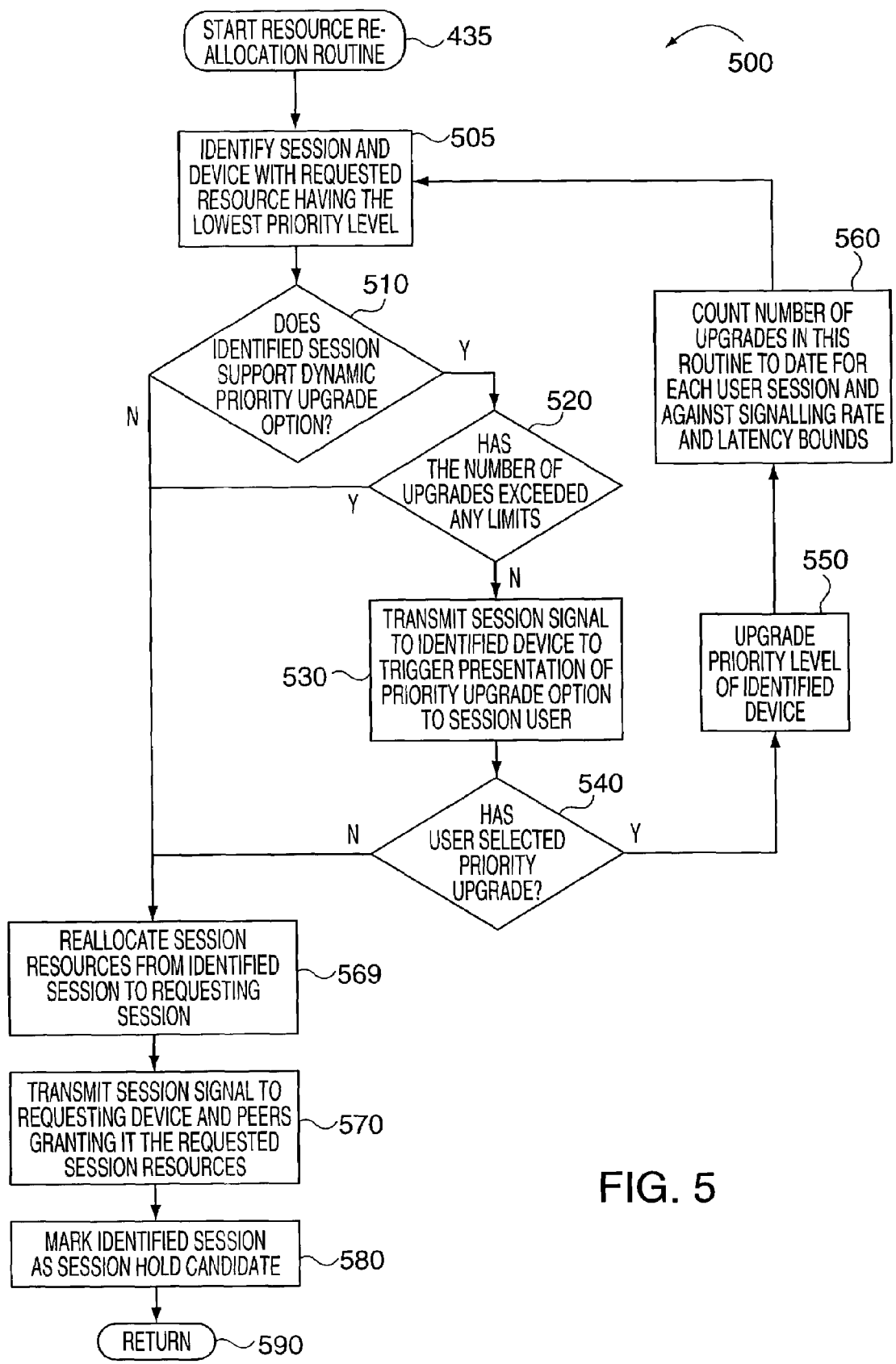
FIG. 5 is a flow diagram illustrating the steps of an exemplary routine that may be used to control resource re-allocation which can be used in conjunction with the method of FIG. 4.

The exemplary resource re-allocation routine 500, shown in FIG. 5, may be used as the BS resource reallocation routine 225 shown in FIG. 2. It may be used in conjunction with routine 400. The resource re-allocation routine starts in step 502, e.g., in response to yes at block 430 and activation of step 435 of the routine 400 in FIG. 4.

Resource reallocation routine 500 is used to redistribute resources as a function of a priority level associated with each session that is using or requesting resources. In accordance with the invention, before being denied the use of its resources needed for an identified communication session of lower priority, an associated identified user and/or device may be presented with the opportunity to upgrade the priority associated with that particular identified communications session.

The routine 500 proceeds from start step 502 to step 505 where an existing session, having the requested resources, in the cell 10 with lowest priority is identified by the BS 12. This session is henceforth called the identified session. In step 510 a test on the identified session data is undertaken to see if the mobile node 14 in the cell 10 corresponding to the identified session, i.e., is a member of the identified session, supports a dynamic priority upgrade option. In accordance with the invention, the dynamic priority upgrade option allows users corresponding to an identified session to dynamically increase the session's priority in an attempt to avoid resource reallocation to the requesting session, and having the identified session dropped or put on hold. The dynamic priority upgrade option may be presented to the mobile node user as part of a bidding war for the resource which occurs with other sessions whose individual resource is sufficient to satisfy the resource request. Note that whilst the exemplary routine in FIGS. 4 and 5 covers the case of a one to one comparison between sessions, it will be obvious to someone skilled in the art that a suitably important requesting session with large resource requirements could result in resources being taken from more than one existing session of lower priority, resulting in a multitude of identified sessions. The requesting session may be included in the bidding processes and considered among the devices from which the requested resource may be taken. In this manner, if the requesting session's priority is exceed as the result of bidding by all the active devices to which the requested resource has already been allocated, the requesting session may be selected as the session to be put into a hold state. In step 510, if the identified session does not support dynamic priority option then operation proceeds directly to step 569 which will be discussed below.

If, in step 510, it is determined that the mobile node associated with the identified session supports the dynamic priority upgrade option, then a test at step 520 is executed to ensure that the number of upgrades in this pass of the routine has not exceeded some limit. If a limit has been exceeded then the routine settles on the present identified session with the lowest priority and proceeds to step 580. If the limit has not been exceeded then another upgrade is allowed and a priority upgrade message is sent to the present identified session user in the cell, e.g., the BS 12 sends the mobile node 14 associated with the identified session a signal indicating that the mobile node should present the user of the mobile node 14, with an upgrade option signal. This may be, e.g., a visible indicator, e.g., a light or text message, presenting the user of the mobile node 14 with a chance to select an upgrade in priority. Thus, the upgrade option message can be presented to the user on a display which is part of the MN 14. Alternatively, the upgrade option signal can be processed by or interact with policy state/user agent processes, e.g., routines, in the MN 14 that automatically control such bidding for priority upgrades, e.g., in accordance with preprogrammed user selections. Such automated control may be based, at least in part, on the increase in priority required to maintain the session and the associated financial cost of increasing session priority to that level at the time the upgrade option signal is received.

In response to the upgrade option signal a mobile node 14 responds to the BS 12 with a signal indicating whether or not the upgrade has been selected, e.g., manually by the user of the mobile node 14 or automatically by the MN 14. The response message is received by the BS 12 from the MN 14. The response message is tested in step 540. If the upgrade option has been refused then the identified session and user is will be left unchanged and processing will proceed from step 540 to step 569. However, if the upgrade option has been accepted then processing passes from step 540 to step 550 where the user session state 212 is updated with the new priority for the session. Then, in step 560 the number of upgrades in this pass of the routine is incremented for the identified user, and for all users so that a limit on the number of bids per user, the signaling rate and latency can be applied to the process of selecting the final identified session. The routine 500 finally passes back to step 505 where the lowest priority session with sufficient resource for the requesting session user is once again identified, taking into consideration the upgrade in priority, for the next loop of the routine. Eventually the processing will proceed to step 569 with a final identified session.

In step 569 session resources are reallocated from the identified device to the requesting device. In this manner, resource reallocation occurs asynchronously from session management, e.g., placing the session from which the resources were reallocated into a hold state or terminating the session. This is consistent with the normal case of session signaling for a specific MN lagging cell resource changes, e.g., unpredictable changes due to radio environment, changes in number of active sessions for the MNs already in a cell, changes in number of active sessions as a result of hand-off of MNs.

From step 569, operation proceeds to step 570 wherein the BS 12 transmits a session signal to the requesting MN 14 and its session peers granting the requested session resources. Then, in step 580, the identified session is marked as a session hold candidate. From step 580 processing returns to the routine which called the resource reallocation routine 500 via return step 590. In the case of a go to operation invoked by step 435 of FIG. 4, operation will be returned to step 440 of routine 400 which then used the session marked as a session hold candidate as part of further processing.

Note that an alternative exemplary method of signaling and receiving bids is to broadcast the requesting session priority out to all session users in the cell and to then collect bids from all users that wish to make a bid that will increase their present session priority, from a level that is lower than the priority of the requesting user. The basestation then selects the lowest resultant session as a session hold candidate. This minimizes the bandwidth and latency of the bidding process.

Figure 6:
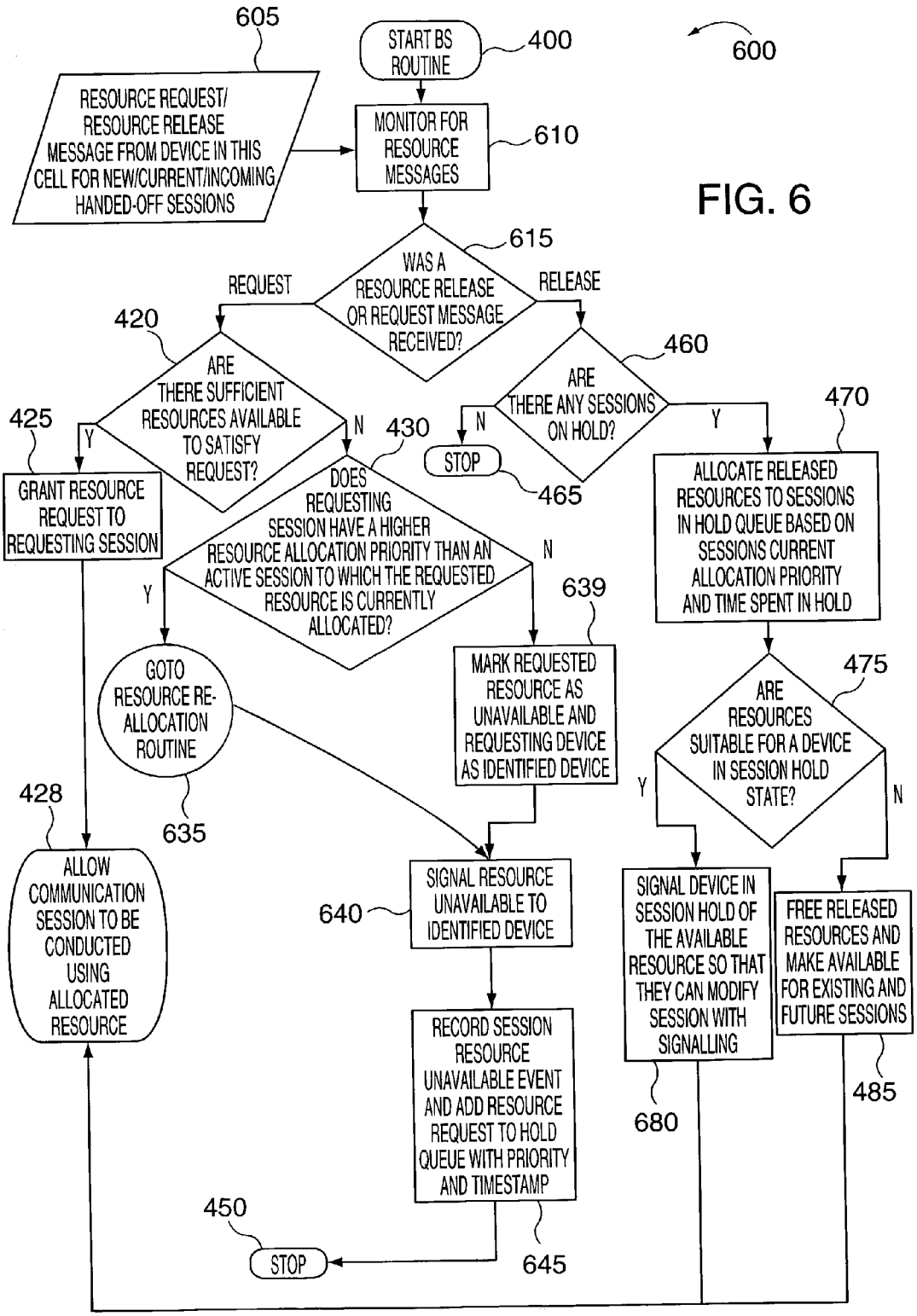
FIG. 6 is a flow diagram illustrating the steps of an exemplary routine that may be used by a basestation to control resources while allowing session hold transitions to be managed by the mobile nodes.
Figure 7:
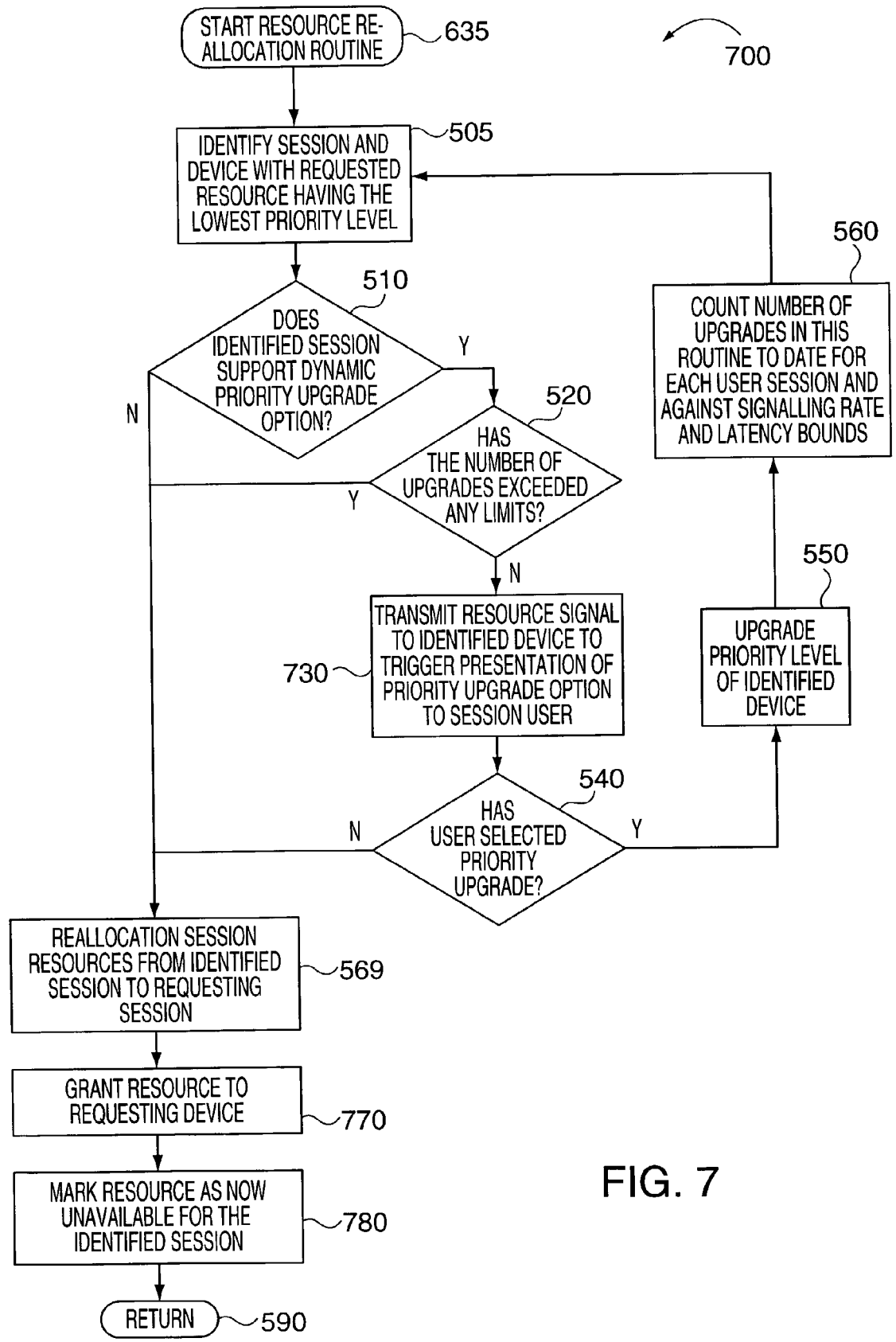
FIG. 7 is a flow diagram illustrating the steps of an exemplary routine that may be used with the method of FIG. 6 to control resource re-allocation.

FIG. 6 shows a flowchart for an alternative basestation routine 600, that employs an alternative a re-allocation routine shown in the flowchart of FIG. 7. In the FIG. 6 embodiment, the basestation 12 identifies a session and corresponding mobile device from which the requested resources are to be reallocated, in the case where there are insufficient resources, to satisfy a request having a higher priority than the session from which the resources are to be reallocated. In the FIG. 6 embodiment the base station notifies the corresponding mobile node 14, from which the resources are to be taken, that the resources are unavailable and the mobile node 14 is given the opportunity to signal that the session using the resource is to be placed into a hold state, the session resources reduced down (not discussed further as this can be treated like a new session to the resource system), or terminated. In such an implementation, the basestation 12 does not have to keep track of a mobile node's ability to support a session hold state leaving the decision to drop a session or place a session into a hold state in response to resource shortages. In such an implementation, the dropping or placing of a session into a hold state is under the control of the mobile node 14, which serves as the end node for the session subject to the resource shortage.

Many of the steps of the FIG. 6 basestation routine 600 are the same as the steps of the previously described routine 400 shown in FIG. 4. For the purposes of brevity such steps are identified in FIG. 6 using the same reference numbers as used in FIG. 4. Such steps will not be described again here. The steps of the basestation routine 600 which differ from the routine 400 are identified using reference numbers in the 600's range. The routine 600 starts at step 602 but, in contrast to the FIG. 4 implementation, the basestation 12 is interested in resource request/release messages that serve as trigger events rather than session release/request messages because in the FIG. 6 embodiment session management is left primarily to the session users, e.g., users of nodes 14. The resource messages 605 might come directly from user resource messages, e.g., RSVP messages, or can instead be derived by the BS 12 from received session messages, e.g., SIP messages. In step 610 the resource messages 605 are monitored. For each received resource message processing proceeds to step 615. In step 615 messages that affect present resource allocations are tested to see if they are a request or a release message.

If the message is a resource request then steps 420, 425, 428, and 430 are performed as in the case of the FIG. 4 embodiment. Note that steps 425 and 430 use information identifying the session associated with a resource request and related priority information. This information is kept in the basestation 12 user session information 222 and is available for use on an as needed basis. With this information, in step 430 the priority of the resource request can be determined. If there is no existing session with the requested resources that has a lower priority, operation will proceed from step 430 to step 640 via step 639. In step 639 the requesting device is marked as an identified device for subsequent processing and the requested resource is marked as unavailable.

If an existing session with lower priority exists, and is using the requested resources, operation will proceed from step 430 to step 640 via step 635. Step 635 is a GOTO step which involves a jump to the alternate resource re-allocation routine 700 shown in FIG. 7.

FIG. 7 shows the alternate resource re-allocation routine with the modified steps being identified with numbers in the 700's. The routine 700 is similar to the routine 500 with the exception of steps 730, 770 and 780. As in the case of the routine 500, the routine 700 seeks to determine, e.g., identify, a session and corresponding device whose resources can be given to the requesting session, whilst giving the session user at a MN 14 in the cell 10 an option to defend its resources by upgrading the priority of its session and hence the priority of its resource requests in the basestation 12. The differences in the FIGS. 5 and 7 embodiments are generally restricted to the signaling plane. In the FIG. 7 embodiment a resource priority upgrade option message, rather than a session message is sent to the local MN in step 730. In addition, in step 770, a resource grant signal is sent to the device associated with a resource request as opposed to a session resource grant signal being transmitted. Finally, at block 780 it is the resource rather than the session that is marked as unavailable for the identified communications session, and it is therefore the resource request, i.e., the previously granted resource request that was canceled as a result of resource reallocation, that is therefore a candidate to be queued at the BS 12. In step 590 the routine 700 returns to FIG. 6 where step 640 is executed next.

As a result of processing in either step 635 or step 639, an identified resource has been marked as unavailable and hence at block 640 a resource unavailable message, with a resource id identifying the specific resource and its relationship to a session at MN 14, is sent to the identified device, e.g., MN 14, in the cell 10. This will cause the MN 14 to react to the resource change by noting the loss of resource, determining the associated session, and then modifying the associated session using session signaling, e.g., SIP. In step 645 the fact that a resource has become unavailable for a session, e.g., the identified session, as a result of a denial of the resource request or reallocation of the resource, is recorded in the hold queue 219 maintained in the basestation's memory 210. This may be done by adding an appropriate resource request to the hold queue 219 with, e.g., a designated priority, a timestamp, the resource id and the associated session identifier. As in the previous example, the removal of resources from a session may occur asynchronously from changes in the session state. Thus, the loss of resources due2 to resource re-allocation will normally occur before the session state is placed into a hold state or the corresponding session from which the resources were take is terminated. A mobile node discovering the loss of resources may signal to the BS 12, in accordance with the invention, whether the session from which the resources were taken should be placed in a hold state or terminated. With the placing of the resource request in the hold queue 219, the associated session in the user session state 213 is marked as short of resources and will be converted in to a session hold state or terminated upon the MN 14 indicating the desired treatment. Following placement of the information in the hold queue 219, processing the resource request message stops in step 450. However, monitoring for additional resource messages continues on an ongoing basis in step 610.

If a resource release message is detected in step 610, instead of a resource request message, processing proceeds from step 610 to step 460 by way of step 615. As in the FIG. 4 example, in step 460 the BS 12 checks to see if there are any sessions on hold as a result of denial of previous resource requests or the reallocation of resources from existing communications sessions. This is accomplished by checking the contents of hold queue 219. Steps 465, 470 and 475 are performed, with step 475 establishing if the freed resources are suitable, e.g., sufficient, for a current session (resource) on hold. If they are not, then the released resources are added to a free resource stack, which includes resources which can be utilized by existing and potential future sessions. If the resources are suitable, e.g., sufficient, for a session on hold, then at step 475 operation proceeds to step 680 where a resource available message is sent to the MN 14 that is a local member of the session to which the freed resources are being allocated. Processing then proceeds to step 428 where the communications session to which resources were allocated, can use the allocated resources for a communications session, e.g., allowing a communication session previously on hold to transition to an on state. Note that the resource available, e.g., resource grant, message could be refused by the MN 14 with a resource or session message due to it no longer wishing to pursue a session, e.g., because it choose to terminate a session as opposed to place it on hold.

The method shown in FIG. 6, enables the MN 14 in the cell 10 where the BS routine 600 is executed, to be informed of the available/unavailable resources for the user sessions at the mobiles 14, 16 in the cell 10, and hence allow the MN 14 or 16 to locally react by sending session signals, e.g., SIP signals, in response to the resource changes. The MN 14 can then either change the session resource requirements (including putting the affected session on hold), borrow resources from another session that that MN 14 is involved in, or cancel the affected session altogether. In accordance with the present invention, the MN 14 issues session signals indicating its decision on how to handle an affected session to the peers and/or base station 12. This mobile node based approach to session management is an alternative to the base station approach to session management described with regard to FIGS. 4 and 5 wherein session signals used to control the termination or placing of sessions into a hold state are generated and transmitted by the basestation 12. The basestation based session management method shown in FIGS. 4 and 5 minimizes the amount of signaling between the MN 14 and its peers, but increases the amount of session knowledge needed at the basestation and ultimately removes or reduces the power from the MN 14 to manage its own sessions as it sees fit. This model is appropriate for simple, dumb mobile nodes 14 running simple sessions, or sessions that the basestation 12 will ultimately have to control. The methods illustrated in FIGS. 6 and 7 in contrast to the FIGS. 4 and 5 methods, minimize the basestation session knowledge requirements but increases the amount of signaling which is performed by the MNs 14, 16. However, the benefit of such signaling is that MN 14 is in control of what it wishes for its communications sessions. This is more like the Internet model which assumes intelligent hosts, and is appropriate in applications where the basestation 12 can yield session control to the mobile nodes 14, 16.

Figure 8:
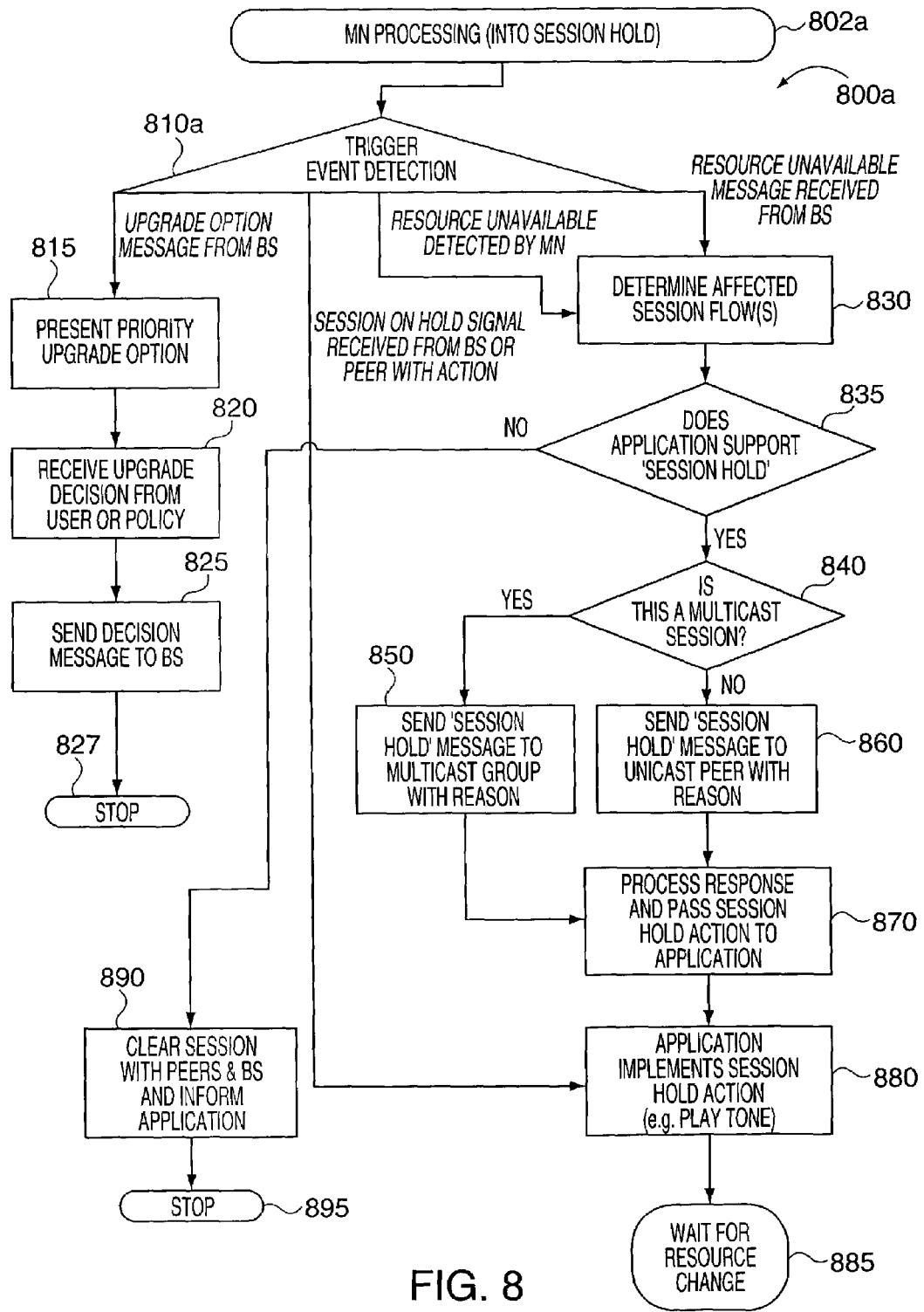
FIG. 8 is a flow diagram illustrating the steps of an exemplary routine that may be used by a mobile node to control the transitioning into a session hold state in response to the occurrence of any one of a plurality of possible trigger events.
Figure 9:
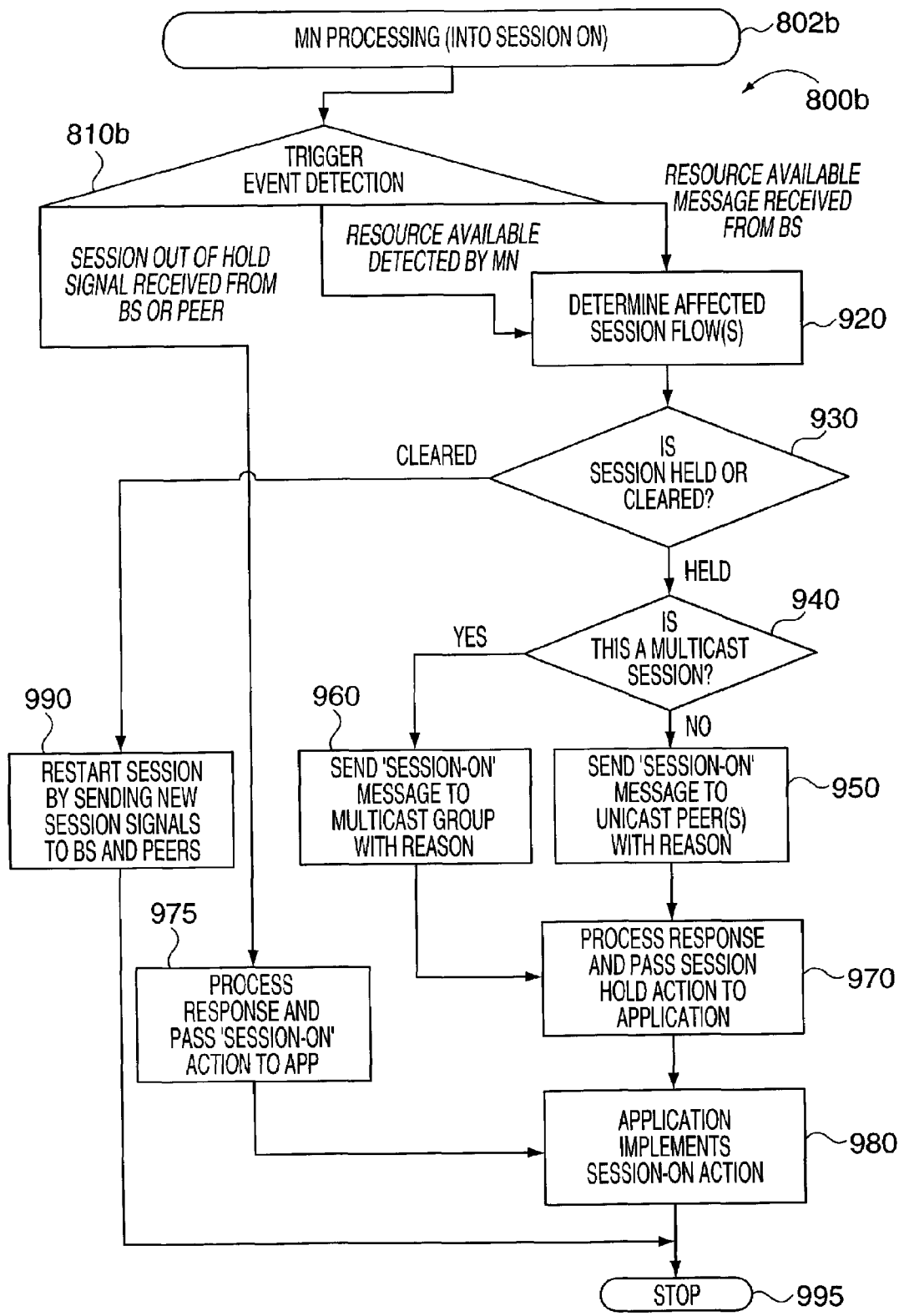
FIG. 9 is a flow diagram illustrating the steps of an exemplary routine that may be used by a mobile node to the transitioning from a session hold state into a session on state in response to any one of a plurality of possible trigger events.

Having described the basestation processing for resource and session on hold management we now move on to the mobile node view of these interactions, which are described in the flowcharts shown in FIGS. 8 and 9.

For a mobile node 14 to be able to roam freely, it should be able to deal with basestations 12, which implement either the method of FIGS. 4 and 5 or the alternative method of FIGS. 7 and 8. This has the advantage of allowing a mobile node 14 to interact with multiple basestations 12, 12' as it moves around or to deal with cases where a single session involves base stations 12, 12' which support different techniques, e.g., the FIG. 4 or FIG. 6 techniques of handling session and resource control.

Exemplary mobile node processing routine 800, comprising first and second parts, 800a and 800b, is shown in FIGS. 8 and 9. The routine 800 may be used as the mobile node processing routine 322 of the mobile node 14.

FIG. 8 illustrates a first portion 800a of the mobile node processing routine 800. Portion 800a handles the processing of trigger events that have the potential to cause a transition of a MN communications session from an "on" state into a session "hold" state. FIG. 9 illustrates the second portion 800b of the mobile node processing routine 800. The second portion 800b handles the processing of trigger events that have the potential of allowing a transition of a MN session from a "hold" state to a "session on" state. A start step 802 of routine 800 is divided into parts 802a shown in FIG. 8 and start step 802b in FIG. 9 for purposes of illustration. However, both parts 802a and 802b represent part of the same step 802 which involves execution of the routine 800 by the mobile node 14. Similarly trigger event detection step 810 is shown as two separate parts 810a and 810b but may be part of a single trigger event detection step. The processing performed following step 810 will depend on the type of trigger event that is detected. For purposes of illustration, FIG. 8 deals with trigger events that may cause a mobile node communications session to transition into a hold state while FIG. 9 deals with trigger events that may cause a mobile node communications session to transition from a hold state to an on state.

Referring to FIG. 8, the MN processing commences at block 800a, in step 810a any one of four types of trigger events may be detected. The first trigger event is an upgrade option message that could either be a session or resource message, and which was issued by a BS 12 while executing a resource reallocation routine, e.g., as part of step 530, 730. This causes processing to pass to step 815 where the upgrade option is presented to a user of the MN 14 or to a user agent process, e.g., automated MN routine. Then in step 820, in accordance with the present invention, a user/user agent upgrade decision is received and in step 825 the received decision is returned, e.g., transmitted, to the basestation 12 as a session or resource upgrade reply message. In stop step 827 processing corresponding to the detected upgrade option message is halted however, step 810 continues to monitor for trigger events which may trigger additional processing by the routine 800.

The second type of trigger event that may be detected in step 810a is a session hold signal received from a basestation 12 or from a session peer, e.g., MN 14 or 16, that has itself decided to put a session on hold. This causes the processing to proceed from step 810a to step 880 where the session application implements the session hold action for that session which is either negotiated during session set-up, configured in the application or signaled, e.g., specified, in the detected session hold message. Processing then proceeds to step 885 where the MN 14 waits for a resource change for the session that has been put on hold. Monitoring in step 810a continues in an attempt to detect additional trigger events thought the processing of a hold signal.

The third trigger event that maybe detected in step 810a is an internal resource unavailable message from a MN networking stack included in the MN 14 that indicates that the MN 14 is not getting sufficient resources for the MN's active sessions and hence below the resources previously promised by the basestation 12. This trigger therefore implies a resource shortage (unavailability) at the basestation 12. Detection of an explicit resource unavailable message received by the MN 14 from a basestation 12 will also result in operation proceeding from step 810a to step 830. This represents the fourth and final trigger event that may be detected in step 810a. Hence either of the last two triggers will cause processing to pass from block 810a to block 830. The MN communication sessions affected by the detected trigger are determined, e.g., identified, in step 830. Operation then proceeds to step 835.

In step 835, the MN session state information 312 is interrogated to see if the session signaling, the session peers and the application associated with the affected session(s), identified in step 830, support session hold. If session hold is not supported then each affected session is cleared using session signaling with peers 14, 16 and the basestation 12, as appropriate to the local basestation 12 processing, e.g., in accordance with the method of FIGS. 6 and 7. Note that the basestation 12 will see the session signaling messages and deduce that the affected session has been cancelled and that the associated resources have been released. Processing proceeds from step 890 to step 895 wherein processing of the detected trigger event stops.

If, however, in step 835 the it is determined that the affected application does support session hold then operation proceeds from step 835 to step 840. In step 840 the MN 14 determines whether the affected session is a unicast or a multicast session. If it is a multicast session in step 850 a multicast session hold message is sent to the multicast session peers. However, if the affected session is a unicast session, operation proceeds instead to step 860 wherein one or more unicast session hold messages are sent to the unicast session peers. Note that a basestation 12 that initiates session hold messages should also be able to send both multicast and unicast session hold messages. The session hold reason in either case (unicast or multicast) should contain a reason code as well as an action code, so that each peer knows why the session is to go into session hold. This enables the peer to decide if it wishes to stay in the session waiting for resource to return, or to save resources at its basestation 12 by canceling its leg of the session with the MN 12. Whether a multicast or unicast session hold message is sent, a response will be received back by the MN 14 indicating that the session hold was either accepted or rejected. If accepted then at step 880 the application and the application peers put the session into hold and implement a session hold action, e.g., an action communicated in the hold message, such as playing a tone. Then, operation proceeds to step 885, wherein the MN 14 and its peers again wait for a resource change so that the session now in the hold state can be restored to an active, e.g., "on" state.

Note that while at step 835 the test is simply shown as whether the affected MN application supports session hold, the MN 14 could still choose to cancel an affected session rather than go into hold. This would cause the MN 14 to move to step 890, cancel the session. Monitoring for trigger events would continue in step 810a despite cancellation of the affected session. Note also that one session end-point puts the session into session hold and out of session on, with a reason code to indicate the reason for this such as resource unavailable, and all peers implement the action code associated with that transition and reason.

Referring to FIG. 9, the MN processing commences at block 800b, where in step 810b any one of three types of trigger events may be detected. The first trigger event that may be detected in step 810b is a session on signal (session out of hold/active) received from the basestation or a session peer. This causes the processing to proceed from step 810b to step 975 where the MN 14 sends a response accepting the session on message and associated reason/action, to the issuing peer/BS, and then passes the action code to step 980, where the application implements the session on action. This could be, for example, to stop playing the tone and start sending/receiving media in the session. The processing then moves to the stop at step 995. Processing of other trigger events continues at step 810b throughout the processing of each detected trigger event and despite stop step 995 being encountered.

The next potential trigger that may be detected in step 810b is a resource available message, from the MN 14 itself, and generated from its internal networking stack having detected that additional resources are now available. An equivalent trigger is the resource available message received from the local basestation which also signals the return of resources to the MN 14. In either case, operation proceeds from step 810b to step 920 where the affected session is determined either as a result of an explicit resource_id in either received or detected resource message, which has a known local mapping to sessions, or as a result of the MN 14 prioritizing its sessions access to shared resources, using the session priority and timestamp state information that was similarly employed by the basestation in FIGS. 4, 5, 6 and 7. At step 930, the selected session is checked to ensure it is still in hold and if it is not, and has already been cancelled, then the processing moves to step 990 where the selected session maybe restarted before we move to step 995. If instead, the session is held at step 930 then we again check to determine if it is a multicast or unicast session in step 940, so that the MN 14 can send the correct type of session on message to its session peers, with reason and action code, using step 950 or step 960. At step 970 the MN 14 receives the session hold response and passes the action code to the application so that at step 980 the application implements the session on action, before processing of the particular detected event stops in step 995. Therefore one session end-point puts the session out of session hold and into session on, with a reason code to indicate the reason for this such as resource now available, and all peers implement the action code associated with that transition and reason.

In summary, the combination of resource and session messages, plus the relationship between those messages and the associated session state being maintained in the basestations 12, 12' and the MNs 14, 16, enables the basestations 12, 12' and the MNs 14, 16 to collaborate to enable sessions to be put into and out of session hold in the presence of resource shortages. The type of application processing whilst in session hold is dependent on both local application policy, session negotiated actions as well as action and reason codes specifically communicated in the session or resource messages that cause the session hold transition. The MN 14 while offered the option of going into session hold can instead cancel the session, or negotiate the session resource requirements lower to fit into remaining resources, or by rebalancing resources from other active sessions. When session hold is signaled by the basestation 12, the flexibility of these choices at the MN 14 is reduced or lost but the complexity of managing such choices is moved to the basestation 12.

As can be appreciated from the foregoing, the present invention permits a mobile host, e.g. mobile node 14, to maintain session state with its session peers whilst the resources for the session are temporarily lost. The session response to a resource shortage can be signaled either by the basestation 12 of the affected mobile node 14, or by the mobile node 14 itself. In addition, resource shortages can be detected both by the MN 14 and by the basestation 12, and in the basestation 12 case a signaling exchange can be initiated with affected MNs 14, 16 to enable an auction of the available resource to be undertaken so the least important session from the users perspective is eventually deprived of resource. The MN 14 or basestation 12 can then respond to resource availability by allowing the session to once again access resources and continue with the session. During resource unavailability, affected sessions are put on hold and the session endpoints given an action to perform such as playing a tome or displaying a message.

The techniques of the present invention can be applied to a wide range of IP based mobile communications applications including E-mail, voice communications, and mobile game applications. Consider application of the invention to a game were a number of players are in a game with multiple players in the same cell. The game server multicasts out game play changes to the players and receives individual player actions via unicast from each player.

If a MN 14 loses uplink resources then the MN 14 can signal to the game server, e.g., basestation 12 in the case of this example, its absence and the game server will freeze the players activity in the game in such a way that the player is not harmed, e.g., the player goes invisible and/or is moved randomly by server so that return spot is unknown, protected from weapons, power stops waning etc. Meanwhile the game server 12 informs all other players of the status change through the multicast game play information, potentially periodically flashing the invisible user as it randomly moves the absent player through the game topology.

When the MN 14 returns, e.g., transitions from session hold to session on, the server 12 puts the player back in a safe spot in the game. If the MN 14 does not return then the absent status times out and the player is moved into a saved state. Meanwhile, the MN 14 can still see others progress in the game.

The MN 14 game software can include a special button that enables the MN 14 to increase its resource priority in the cell 10 which the MN 14, e.g., incurring a higher price charge for services. It is pp to the MN 14 whether it uses the priority upgrade feature but when enabled it is applied for a fixed period of time, a bit like gaining more weapons in a game because better scheduling means lower latency and an advantage with respect to other players.

If the game play from the central server 12 is lost then the game instructions in the MN 14 become useless because the MN 14 cannot see the effects of its actions on the game play. Therefore, both uplink and downlink are lost together for the various players in the affected cell 10 and they go into the absent state by the basestation 12 sending the required session message stating the affected users. The basestation 12 also multicasts a single message to the MNs 14, 16 to indicate that they are in absent state. As they independently change cells so they independently can rejoin the game. If the players in the cell 10 press the improved resource button then they contribute to the resource flow being resurrected and share the cost for the upgrade in service priority.

The response to the absent message might include a trigger for the MN 14 to go into a local game play mode where the user can change configurations as part of the game (change car, weapons, pick a return spot etc) so that when gameplay returns the user has not be wasting time, twiddling thumbs and the new configuration can be sent to the server 12. If only the uplink is lost then the MN 14 can still play within the static environment of the game by deciding where they will return and with what weapons etc so that when the uplink returns they can rejoin very quickly in a very active state.

In addition, it is possible to implement a very low bitrate gameplay channel still being available so that the user has some high-level sense of what is happening in the game even when full participation is not possible due to communications resource limitations.

The multi-user game example is just one exemplary application in which the methods and apparatus of the present invention can be used.

What is claimed is:

1. A method of operating a basestation in a mobile communications system, the method comprising:
   receiving a message requesting allocation of a communications resource;
   identifying an existing communications session using the requested resource;
   reallocating the requested resource from the existing communications session; and
   placing the existing communications session in a session hold state by continuing to support session control signaling for the existing communications session while denying resources for a data portion of the existing communications session.

2. The method of claim 1, further comprising:
   transmitting a resource grant signal to a mobile node that requested allocation of said communications resource.

3. The method of claim 1, wherein the step placing the existing communications session in a session hold state includes storing a session identifier corresponding to the existing communications session in a hold queue.

4. The method of claim 3, wherein the step of placing the existing communications session in a session hold state further includes:
   transmitting a session hold message to a mobile node participating in said communications session.

5. The method of claim 1, further comprising:
   receiving a message releasing a communications resource; and
   identifying a communications session in a hold state from information included in said hold queue to allocate said released communications resource to.

6. The method of claim 5, wherein the step of identifying a communications session in said hold queue includes:
   selecting a communications session in a hold state to allocate the released resources to as a function of the stored priority level information and hold start time associated with each communications session identifier stored in said hold queue.

7. The method of claim 5, further comprising the step of:
   transmitting a signal to a mobile node associated with the identified communications session to cause said mobile node to transition said identified communications session from a hold state to an on state.

8. The method of claim 1, wherein the step of identifying an existing communications session using the requested resource includes:
   transmitting a priority upgrade option message to a communications device using the requested resource.

9. The method of claim 8, wherein the step of identifying an existing communications session using the requested resource includes:
   receiving a priority upgrade reply message from the communications device to which said priority upgrade option message was transmitted.

10. A method of operating a basestation in a mobile communications system, the method comprising:
   receiving a message requesting allocation of a communications resource;
   identifying an existing communications session using the requested resource;
   reallocating the requested resource from the existing communications session;
   placing the existing communications session in a session hold state, wherein placing the existing communications session in a session hold state includes storing a session identifier corresponding to the existing communications session in a hold queue; and
   wherein said hold queue includes, for each identified session in said hold queue, a session hold start time and a session priority level indicator.

11. The method of claim 10, wherein said hold queue further includes information on the resources needed to transition each identified session in said queue from a hold state to a session on state.

12. A basestation in a mobile communications system, the basestation comprising:
   a receiver circuit for receiving a message requesting allocation of a communications resource;
   means for identifying an existing communications session using the requested resource;
   means for reallocating the requested resource from the existing communications session; and
   means for placing the existing communications session in a session hold state in which resources are provided to support session control signaling while denying resources for a data portion of the communications session.

13. The basestation of claim 12, further comprising:
   means for transmitting a resource grant signal to a mobile node that requested allocation of said communications resource.

14. The basestation of claim 12, wherein said means for identifying an existing communications session includes:
   means for transmitting a priority upgrade option message to a communications device using the requested resource.

15. The method of claim 14, wherein said means for identifying an existing communications session includes:
   means for processing a priority upgrade reply message received from the communications device to which said priority upgrade option message was transmitted.

16. A method of operating a basestation in a communications system, the method comprising:
   receiving a request for a communications resource;
   identifying an existing communications session utilizing said resource;
   transmitting a priority upgrade option message to a mobile device associated with said identified existing communications session;
   receiving a priority upgrade option reply message from said mobile device; and
   determining whether to reallocate the requested communications resource from said identified existing communications session in response to said request as a function of the received priority upgrade option reply message.

17. A method of operating a basestation in a communications system, the method comprising:
   receiving a request for a communications resource;
   identifying an existing communications session utilizing said resource;
   transmitting a priority upgrade option message to a mobile device associated with said identified existing communications session;
   receiving a priority upgrade option reply message from said mobile device;
   determining whether to reallocate the requested communications resource from said identified existing communications session in response to said request as a function of the received priority upgrade option reply message; and
   wherein determining whether to reallocate the requested communications resource from said identified existing communications session in response to said request as a function of the received priority upgrade option reply message includes:
   processing said priority upgrade option reply message to upgrade a priority level associated with the identified existing communications session when said reply message indicates that a priority upgrade option has been selected.

18. The method of claim 17, wherein determining whether to reallocate the requested communications resource from said identified existing communications session in response to said request as a function of the received priority upgrade option reply message includes:
   comparing a priority level associated with said resource request to the priority level associated with said identified existing communications session.

19. The method of claim 18, further comprising:
   transmitting a message to place the identified existing communications session into a session hold state when the priority level associated with said resource request exceeds the priority level associated with said identified existing communications session.

* * * * *